United States Patent
Juettner et al.

(10) Patent No.: US 8,857,900 B2
(45) Date of Patent: Oct. 14, 2014

(54) WATER BOX AND METHOD FOR PRODUCTION

(71) Applicant: GM Global Technology Operations LLC, Detroit, MI (US)

(72) Inventors: Marc Juettner, Nackenheim (DE); Juergen Vollhardt, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/671,840

(22) Filed: Nov. 8, 2012

(65) Prior Publication Data

US 2013/0127207 A1    May 23, 2013

(30) Foreign Application Priority Data

Nov. 11, 2011    (DE) .................. 10 2011 118 323

(51) Int. Cl.
  *B62D 25/08*    (2006.01)
  *B60R 13/07*    (2006.01)

(52) U.S. Cl.
  CPC .............. *B62D 25/081* (2013.01); *B60R 13/07* (2013.01)
  USPC ........................................ 296/192; 296/208

(58) Field of Classification Search
  CPC .................................................... B62D 25/081
  USPC .................................................. 296/192, 208
  See application file for complete search history.

(56) References Cited

U.S. PATENT DOCUMENTS 5,561,882 A * 10/1996 Eustache et al. .......... 15/250.001
7,219,953 B2 * 5/2007 Mori ............................. 296/192
7,316,448 B2   1/2008 Koyama et al.
7,766,417 B2   8/2010 Kannan et al.
7,988,223 B2 * 8/2011 Nakajima et al. ............. 296/192
2008/0093891 A1 * 4/2008 Benvenuto et al. ........... 296/192

FOREIGN PATENT DOCUMENTS

| | | |
|---|---|---|
| DE | 102004049034 A1 | 4/2006 |
| EP | 1800998 B1 | 1/2010 |
| JP | 2003002241 A | 1/2003 |
| JP | 20050280680 A | 4/2007 |
| JP | 2009001216 A | 1/2009 |
| JP | 2009090787 A | 4/2009 |
| JP | 2009149165 A | 7/2009 |
| JP | 2010023536 A | 2/2010 |
| JP | 2010083326 A | 4/2010 |
| JP | 2010-137694 * | 6/2010 |
| WO | 2006021246 A1 | 3/2006 |

OTHER PUBLICATIONS

German Patent Office, German Search Report for Application No. 102011118323.3, dated Jul. 6, 2012.

* cited by examiner

*Primary Examiner* — Dennis H Pedder
(74) *Attorney, Agent, or Firm* — Ingrassia Fisher & Lorenz, P.C.

(57) ABSTRACT

A water box, in particular for a motor vehicle, is provided. The water box includes a back wall, which rises from a lower side up to below a front window frame from where it continues as a covering the longitudinal direction of which is arranged transversely to a traveling direction in order to create an impact protection, and a front wall, which extends from the lower side in the direction of an engine compartment. The back wall, the covering and the front wall are embodied unitarily. A method for producing a water box is also provided.

17 Claims, 6 Drawing Sheets

WATER BOX AND METHOD FOR PRODUCTION

CROSS-REFERENCE TO RELATED APPLICATION

This application claims priority to German Patent Application No. 10 2011 118 323.3, filed Nov. 11, 2011, which is incorporated herein by reference in its entirety.

TECHNICAL FIELD

The present disclosure relates to a water box, in particular for a motor vehicle. In addition to this, the present disclosure relates to a method for producing a water box.

BACKGROUND

A generic water box for motor vehicles is known in the relevant prior art. In DE 10 2004 049 034 A1 a water box for a passenger car is described, which is arranged below the lower edge of the front window frame and under the rear edge of a front hood and is limited towards the front by a front wall whose longitudinal direction extends transversely to the vehicle longitudinal direction. In order to improve the water box with respect to pedestrian protection, the front wall in its middle to entire region of its length yields at least in its upper region towards the bottom in the case of a loading effective from above caused through a head impact that exceeds a predetermined safety value.

Accordingly, it is desirable to provide a water box that can be easily produced. In addition, other objects, desirable features and characteristics will become apparent from the subsequent summary and detailed description, and the appended claims, taken in conjunction with the accompanying drawings and this background.

SUMMARY

According to various exemplary embodiments, a water box is provided. In one exemplary embodiment, the water box comprises a back wall, which from a lower side rises up to below a front window frame where it continues as a covering the longitudinal direction of which is arranged transversely to a traveling direction in order to create an impact protection and a front wall, which extends from the lower side in the direction of an engine compartment, wherein the back wall, the covering and the front wall are embodied unitarily.

According to the various teachings of the present disclosure, a water box is created which because of the unitary embodiment leads to a reduction of the parts to be installed in a motor vehicle. Consequently, fewer parts have to be stopped during the production, which brings about a further lowering of costs. Since the water box is produced as a single part and no assembly has to be performed, the achievable production tolerances can also be lowered. Because of the simple construction, the weight of the water box can also be lowered, which in turn leads to or can lead to a saving during the vehicle operation. Furthermore, the water box is also provided with an impact protection as passive safety feature.

In another exemplary embodiment of the present disclosure, a lower part element can be attached to the lower side of the back wall.

Water boxes are often provided as at least two-piece arrangement, wherein an upper part element comprising the back wall, the covering and the front wall is connected to the lower part element. The lower part element for example is a bulkhead, which can be arranged between a vehicle engine and an interior space of a passenger compartment. According to this exemplary embodiment, the present disclosure can cover diverse fields of application.

In another exemplary embodiment of the present disclosure, the covering comprises at least one predetermined breaking point which breaks in the case of a force loading. The covering in a motor vehicle is that part of the water box that is visible from outside of the motor vehicle between the front window frame and an engine hood, so that forces from the outside can also act on the covering. For example, a force loading that originates from an impact can take place here. In order to protect the impacting element, which for example can be a pedestrian, from injuries, the covering comprises a predetermined breaking point that breaks in the case of the force loading, in order to bring about a damping of the impact in this way.

In another exemplary embodiment of the present disclosure, the covering comprises at least one impact zone in which a wall thickness is reduced so that the impact zone yields in the event of a force loading.

The impact zone is arranged in the covering so that it is visible from outside of the motor vehicle so that forces from the outside can also act on the covering. In the case of a force loading which for example can originate from an impact with a pedestrian, the reduced wall thickness brings about a damping of the impact. The damping of the impact brings about an increase of the passive safety of a motor vehicle.

In another exemplary embodiment of the present disclosure, the back wall, the covering or the front wall comprise at least one reinforcing means.

The water box often comprises expansive elements, which nevertheless have to be arranged without component distortion. In addition it can be provided to fasten further components with high individual weight to the water box. According to the various teachings of the present disclosure, a reinforcing means can be employed which in these two cases withstands the higher loading and ensures a distortion-free assembly in a motor vehicle.

In another exemplary embodiment of the present disclosure, the reinforcing means is formed by introducing a reinforcing material with greater loading capacity.

To this end, it can be provided for example to introduce the reinforcing means as reinforcing material with greater loading capacity in the form of elongated or flat elements such as braces, plates or similar in selected locations in the material of the water box. Consequently, a hybrid material is employed in order to increase the mechanical stability in a simple manner.

In another exemplary embodiment of the present disclosure, the reinforcing means is formed by reinforcing a wall thickness of the water box.

To this end it can be provided for example to form the reinforcing means by reinforcing the wall thickness in the form of elongated or flat elements in selective locations. Accordingly, the water box is provided from a single material in order to increase the mechanical stability in a simple manner.

In another exemplary embodiment of the present disclosure, the rear wall, the covering and the front wall can be produced by means of an injection molding method or a hybrid injection molding method.

Both production methods make possible the production of the water box in a simple and cost-effective manner, wherein depending on the choice of the reinforcing means either the injection molding method or the hybrid injection molding method can be selected.

In another exemplary embodiment of the present disclosure, a connecting element in the form of an at least partial diagonal bracing is unitarily attached between the back wall and the covering.

Accordingly, a further improvement of the stability of the water box is made possible. The connecting element in this case can be embodied in the form of a diagonal bracing, which depending on application is carried out either on individual locations or over the entire length of the water box. Because of the unitary construction, the connecting element can likewise be formed by means of injection molding or hybrid injection molding during the production.

In a method for producing a water box according to the various teachings of the present disclosure, in one example, for a motor vehicle, the following can be carried out: providing an injection mold; injection-molding the water box comprising a back wall which rises from a lower side up to below a front window frame where it continues as a covering the longitudinal direction of which is arranged transversely to a traveling direction in order to create an impact protection, and a front wall which extends from the lower side in the direction of an engine compartment, wherein the back wall, the covering and the front wall are embodied unitarily.

According to the various teachings of the present disclosure, the production of a water box is stated in a unitary exemplary embodiment. Accordingly, the parts to be installed in a motor vehicle are reduced so that fewer parts have to be stopped for the production. Because of the missing step of the assembly, the achievable production tolerances can also be lowered. The water box has a low weight and in addition makes available an impact protection as passive safety feature, which in accordance with the requirements can be configured even further through predetermined breaking points or special impact protection zones.

Furthermore, a motor vehicle having a water box according to the present disclosure is provided.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
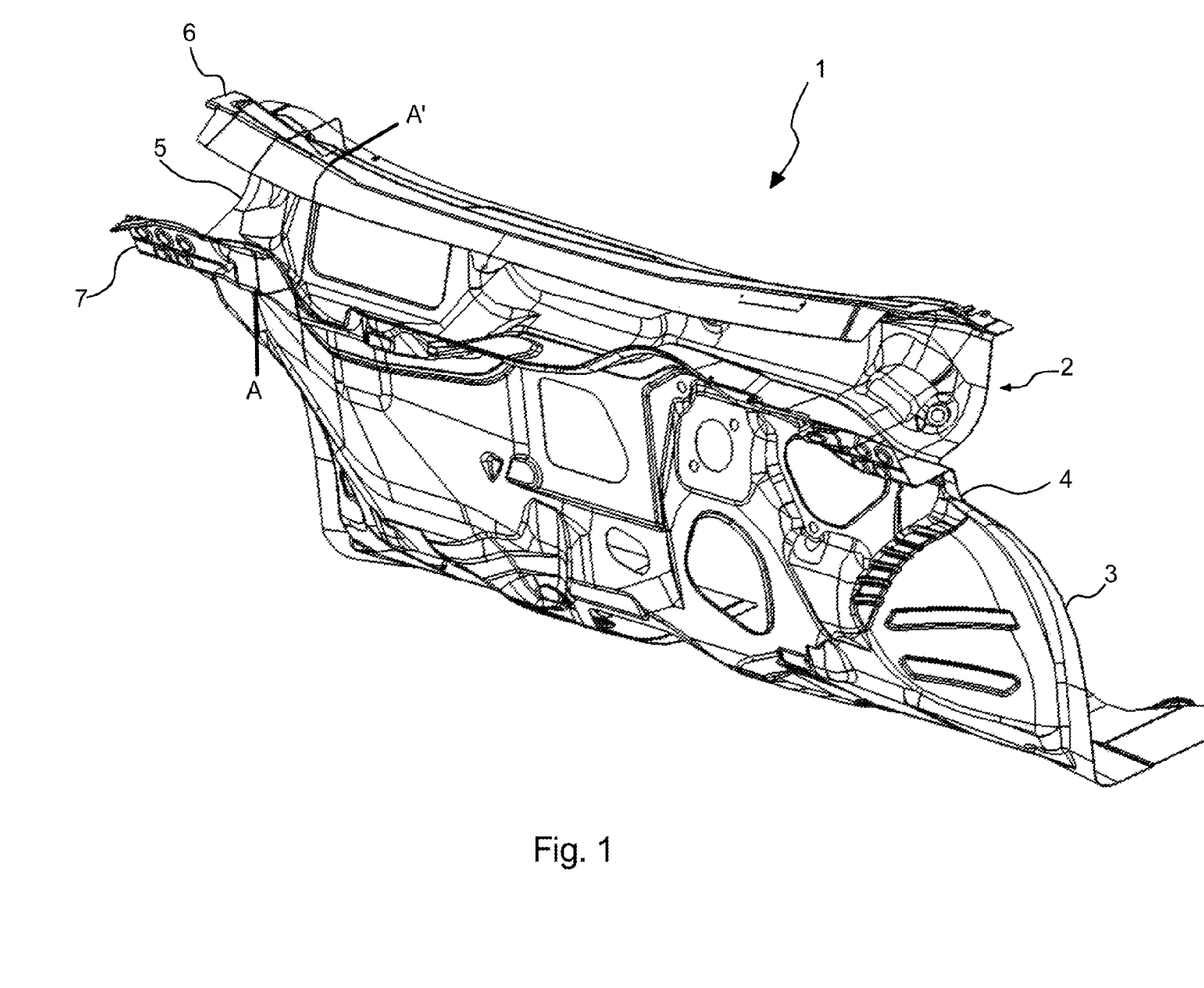
FIG. 1 a water box according to an exemplary embodiment of the present disclosure in a lateral view.

Making reference to FIG. 1, an exemplary embodiment of a water box 1 according to the present disclosure is explained in more detail in the following. In FIG. 1, the water box 1 is shown in a perspective representation, wherein the view direction is lateral in traveling direction upon installation in a motor vehicle.

As is evident from FIG. 1, the water box 1 comprises an upper part element 2 and a lower part element 3. The upper part element 2 and the lower part element 3 are interconnected at a connecting location. The upper part element 2 and the lower part element 3 extend in longitudinal direction over the entire width of a vehicle.

The water box 1 in the installed state is located below a front window frame (not shown in FIG. 1) and between a passenger interior (not shown in FIG. 1) and an engine compartment (not shown in FIG. 1). The water box 1 comprises a back wall 5 in the upper part element 2, which rises from a lower side 4 at the height of the connecting point as far as to below the front window frame. From there, the water box 1 continues as covering 6 which is arranged in longitudinal direction transversely to a traveling direction in order to create an impact protection. Furthermore, the water box 1 comprises a front wall 7 which extends from the lower side in the direction of the engine compartment. A special feature of the water box shown in FIG. 1 is that the back wall 5, the covering 6 and the front wall 7 are embodied unitarily.

Here, the upper part element 2 comprising the back wall 5, the covering 6 and the front wall 7 can be produced by means of an injection molding method or a hybrid injection molding method.

The covering 6 acts as impact protection in order to create an additional element for the passive safety of a motor vehicle. To this end, it can be provided in one example, that the covering 6 comprises at least one predetermined breaking point which breaks in the event of an impact. The predetermined breaking point can for example be formed by means of a clearance in the material of the covering 6, wherein the remaining wall thickness of the covering 6 can be utilized for presetting that force at which the predetermined breaking point breaks.

Figure 2:
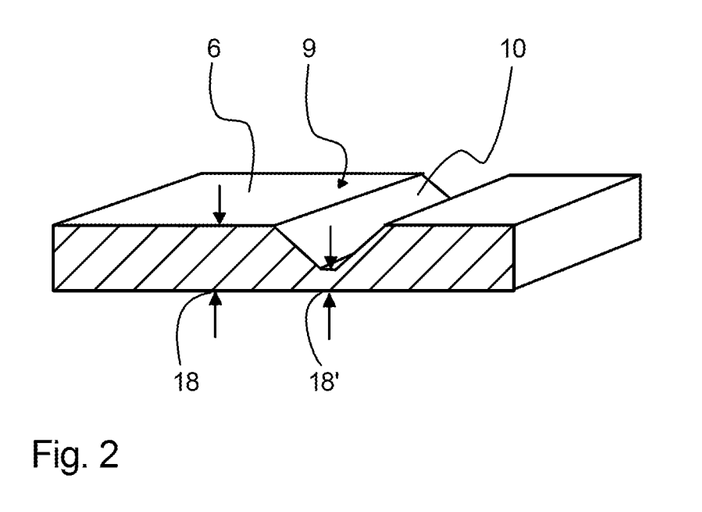
FIG. 2 a section through the water box from FIG. 1.

In FIG. 2, a detail view of the water box 1 is shown in order to explain the forming of the predetermined breaking point in more detail. FIG. 2 shows a section through a part of the covering 6, wherein the predetermined breaking point 9 is formed in that a clearance 10 is created during or after the production of the water box 1, which in the shown example is carried out in a notch-like manner. The clearance 10 in this case can be carried out partially continuously or over its entire length can comprise a certain residual thickness of its base, as is shown in FIG. 2 by means of a wall thickness 18' which in comparison with the wall thickness 18 is reduced in the region of the covering 6. Furthermore, the predetermined breaking point 9 can also be formed through clearances 10, which are arranged on both sides of the covering 6. The predetermined breaking point 9 is carried out such that upon a loading of the covering 6 with a force the clearance would break partially or completely.

It can be provided, furthermore, that the covering 6 comprises at least one impact zone, in which the wall thickness of the wall covering 6 is reduced so that the impact zone yields in the case of an impact. Accordingly, an impact zone is created, which because of its yielding in the case of a force loading, has an improved characteristic with respect to pedestrian protection.

The reduction of the wall thickness in the covering 6 in this case can take place similar to the forming of the clearance 10 explained with reference to FIG. 2, wherein the form or depth of the clearance 10 can be suitably selected by choosing the reduced wall thickness 18' in order to achieve the yielding explained above.

As is evident from FIG. 1, the water box 1 partially comprises expansive components. In order to rectify possible structural weaknesses, it is provided that the back wall, the covering 6 or the front wall 7 can comprise a reinforcing means.

Exemplary embodiments of the reinforcing means 19 are explained in more detail in the following making reference to FIG. 3.

Figure 3:
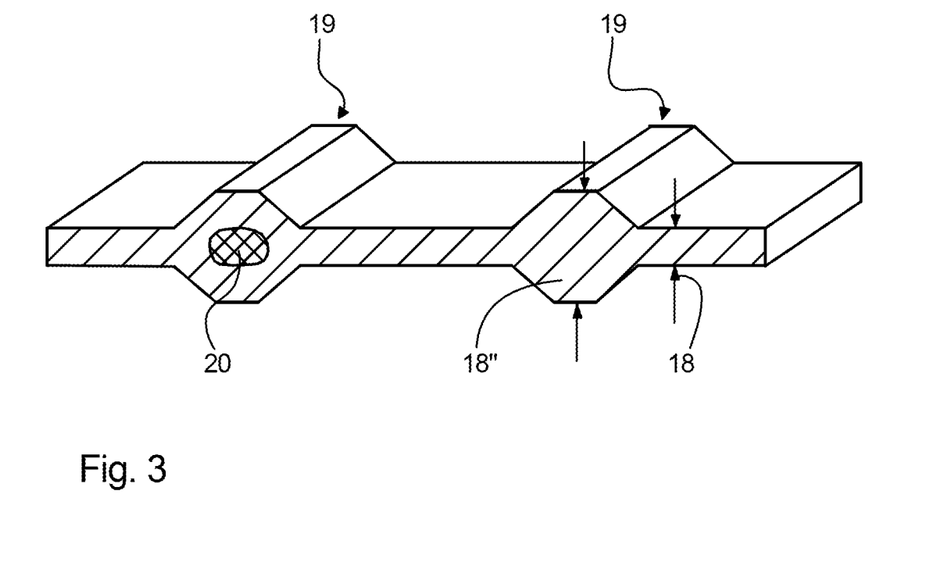
FIG. 3 a detail view of a water box according to another exemplary embodiment of the present disclosure.

The reinforcing means 19 can for example be formed by introducing an additional material 20 with greater loading capacity, as is shown in FIG. 3 on the left side of the representation. However, it is also provided that the reinforcing means 19 is formed through targeted reinforcing of the wall thickness 18" of the water box 1, as is shown in FIG. 3 on the right side of the representation.

While with one exemplary embodiment a hybrid injection molding method is used for the production, a simpler injection molding method can be used according to another exemplary embodiment in order to produce the upper part 2 of the water box 1 as a single work piece.

Although the use of an injection molding method constitutes a certain restriction with respect to the injection molds that can be realized, it is however nevertheless possible to optimize the water box 1 with respect to the installation of windshield wipers, which are likewise located in the region of the water box 1, and the drainage of water and the connection to the front window frame. The water box 1 according to the present disclosure has a low weight and moreover leads to a reduction of the number of the components during the production of a motor vehicle. On the one hand, this reduces the stock keeping costs but also the means to be expended for the development of parts. Furthermore, the unitary production proves to be advantageous with respect to the component tolerances to be realized.

Figure 4:
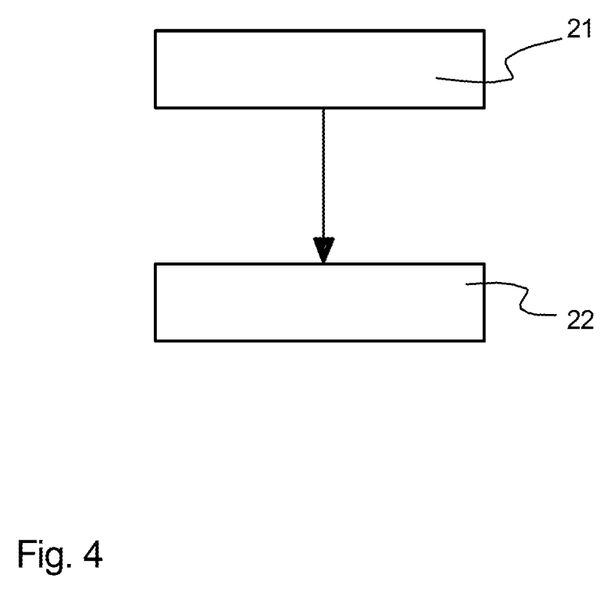
FIG. 4 a detail view of a water box according to another exemplary embodiment of the present disclosure.

A method for producing the water box 1 is explained in more detail in the following making reference to FIG. 4.

In 21, the providing of a suitable injection mold takes place. Following this, an injection molding of the water box 1 is carried out in 22. The water box 1 then comprises the back wall 5, which rises from the lower side 4 up to below a front window frame from where it continues as a covering 6 the longitudinal direction of which is arranged transversely to a traveling direction in order to create the impact protection, and the front wall 7, which extends from the lower side 4 in the direction of an engine compartment, wherein the back wall 5, the covering 6 and the front wall 7 are embodied unitarily.

Figure 5:
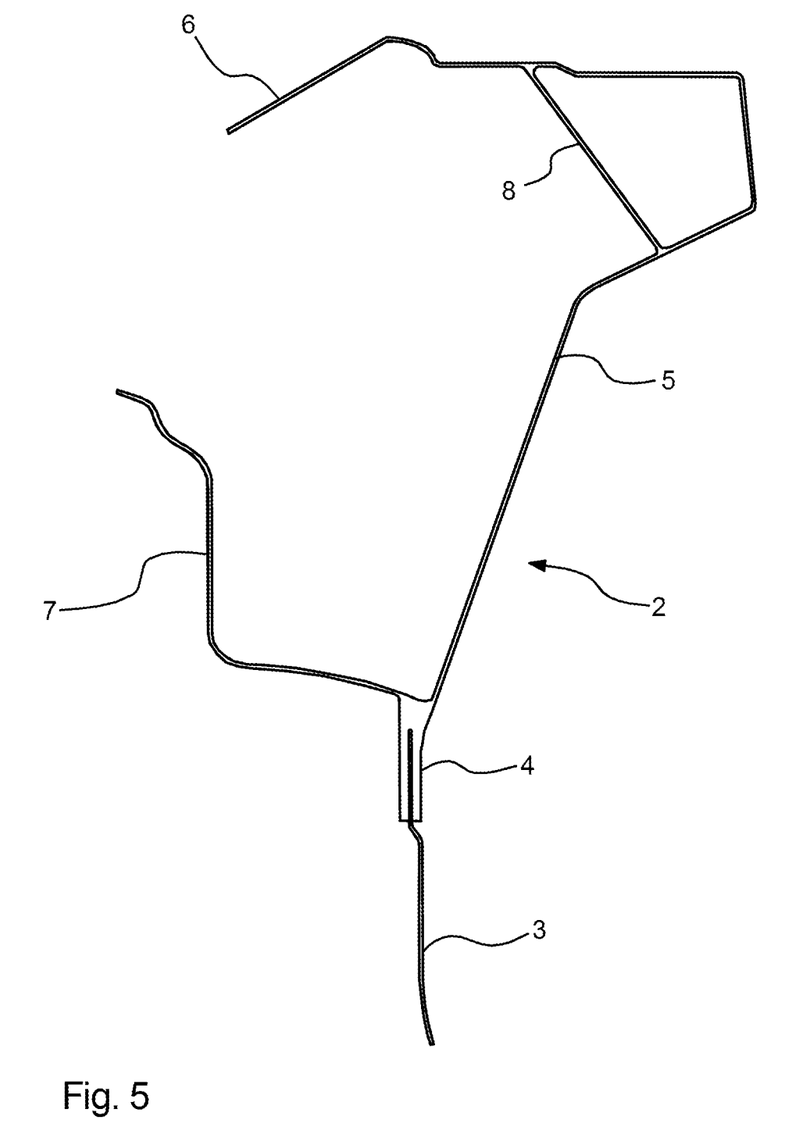
FIG. 5 a flow diagram for illustrating a method according to the present disclosure.

Making reference to FIG. 5, a cross-sectional view through the water box 1 according to an exemplary embodiment of the present disclosure is explained in the following. As indicated in FIG. 1, the cross section in FIG. 2 in this case follows the line A-A'.

The water box 1 comprises the upper part element 2 and the lower part element 3, which are interconnected as a connecting point near the lower side 4, for example through gluing. The front wall 7 extends in the direction of the engine compartment. The back wall 5, which merges into the covering 6 below a front window frame extends from the connecting point 4 as far as to the lower side of the front window frame. It can be advantageous for improving the stability to provide a connecting element 8 as diagonal brace between the back wall 5 and the covering 6, which supports the covering 6 in its position. The connecting element 8 is also created in the unitary production process.

Figure 6:
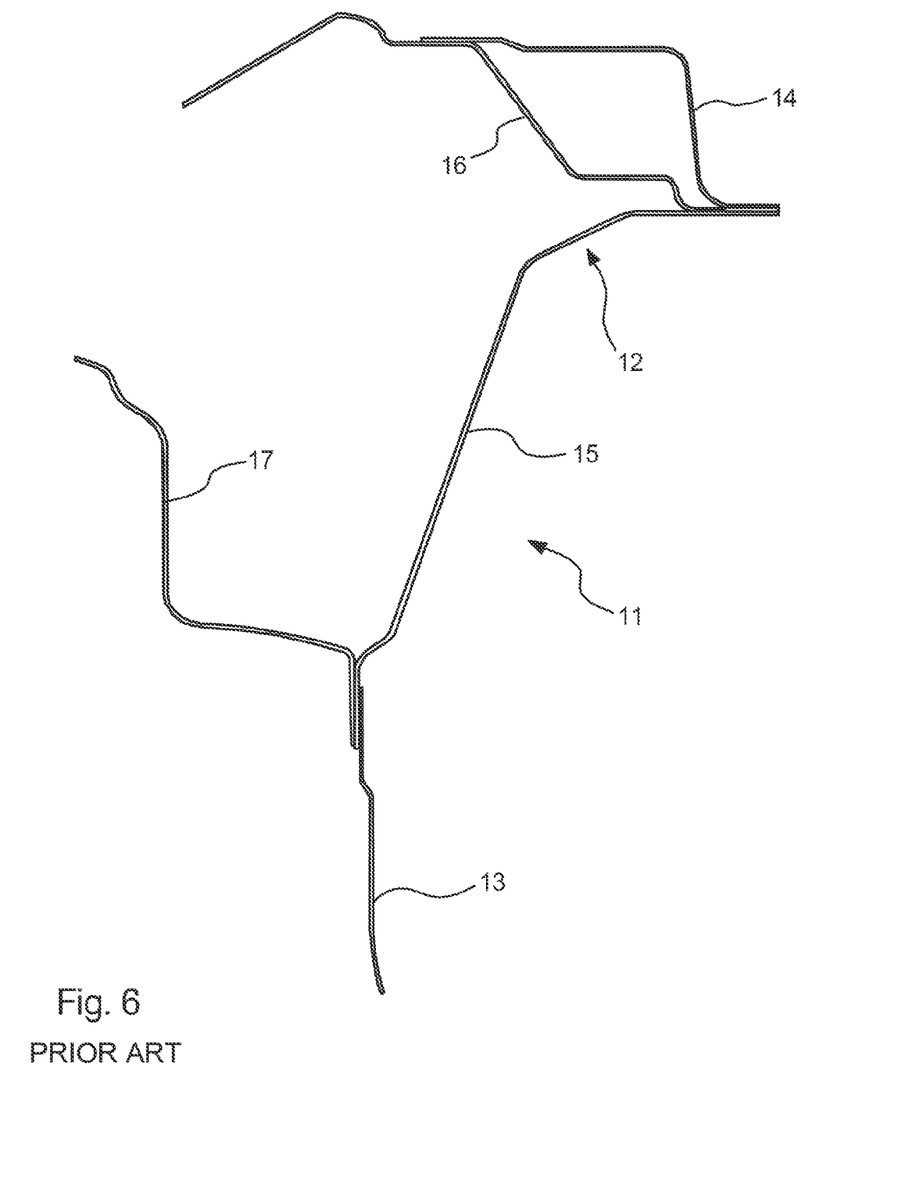
FIG. 6 a section through a water box according to a comparative example.

In comparison with this, a conventional water box 11 is shown in FIG. 6, which was taken from a company-internal comparison example. It is evident that the water box 11 likewise comprises an upper part 12 and a lower part 13. The upper part 12 comprises a conventional back wall 15, a conventional covering 16 and a reinforcement 14. Furthermore, the conventional water box 11 comprises a conventional front wall 17. These elements are produced as individual pieces with the conventional water box 11 and interconnected through clamping or screwing.

Because of its unitary embodiment, the water box according to the present disclosure comprises a simplification of the production. Apart from this, the parts to be installed in a motor vehicle are reduced so that fewer parts have to be kept in stock during the production. Because of the missing step of the assembly, the production tolerances that can be achieved can also be lowered. The water box 1 has a low weight and in addition makes available an impact protection as passive safety feature which depending on the requirements can even be further configured through predetermined breaking points or special impact protection zones.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A water box for a motor vehicle, comprising:
a back wall, which rises from a lower side up to below a front window frame, the back wall having a first back wall end and a second back wall end, the second back wall end coupled to the lower side,
a covering, which continues from the first back wall end, the covering arranged transversely to a traveling direction of the motor vehicle and including at least one predetermined breaking point that breaks in response to a force loading in order to create an impact protection, and
a front wall which extends from the lower side in the direction of an engine compartment, the front wall having a first front wall end and a second front wall end, the second front wall end coupled to the lower side,
wherein the back wall, the covering and the front wall are embodied unitarily in one piece, the covering extends outwardly from the first back wall end towards the first front wall end, and the first front wall end is spaced apart from the covering.

2. The water box according to claim 1, wherein a lower part element is attached to the lower side of the back wall.

3. The water box according to claim 1, wherein the covering further comprises at least one impact zone in which a wall thickness is reduced so that the impact zone yields in the case of a force loading.

4. The water box according to claim 1, wherein at least one of the back wall, the covering and the front wall further comprises at least one reinforcing means.

5. The water box according to claim 4, wherein the at least one reinforcing means is formed by introducing a reinforcing material with greater loading capacity.

6. The water box according to claim 4, wherein the at least one reinforcing means is formed through reinforcing a wall thickness of the water box.

7. The water box according to claim 1, wherein the back wall, the covering and the front wall is produced by an injection molding method.

8. The water box according to claim 1, wherein the back wall, the covering and the front wall is produced by a hybrid injection molding method.

9. The water box according to claim 1, wherein between the back wall and the covering a connecting element in the form of at least one partial diagonal bracing is unitarily attached.

10. A method for producing a water box for a motor vehicle, comprising:
   providing an injection mold; and
   injection molding the water box including a back wall, which rises from a lower side up to below a front window frame from where it continues as a covering, the longitudinal direction of which is arranged transversely to a traveling direction in order to create an impact protection, and a front wall, which extends from the lower side in the direction of an engine compartment, wherein the back wall, the covering and the front wall are molded unitarily and the front wall is spaced apart from the covering.

11. A motor vehicle, comprising:
   a water box including a back wall, which rises from a lower side up to below a front window frame, the back wall having a first back wall end and a second back wall end, the second back wall end coupled to the lower side, a covering, which continues from the first back wall end, wherein a longitudinal direction of the covering is arranged transversely to a traveling direction of the motor vehicle in order to create an impact protection, the covering having a first side facing an exterior of the motor vehicle and a second side opposite the first side, and a front wall which extends from the lower side in the direction of an engine compartment, the front wall having a first front wall end and a second front wall end, the second front wall end coupled to the lower side and the second side of the covering facing the front wall,
   wherein the back wall, the covering and the front wall are embodied unitarily in one piece by injection molding, the covering includes a plurality of predetermined breaking points, with at least one of the plurality of predetermined breaking points formed on the first side of the covering and at least one of the plurality of predetermined breaking points formed on the second side of the covering, each of the plurality of predetermined breaking points breaking in the case of a force loading, and the covering extends outwardly from the first back wall end towards the first front wall end, with the covering spaced apart from the first front wall end.

12. The motor vehicle according to claim 11, wherein a lower part element is attached to the lower side of the back wall.

13. The motor vehicle according to claim 11, wherein the covering further comprises at least one impact zone in which a wall thickness is reduced so that the impact zone yields in the case of a force loading.

14. The motor vehicle according to claim 11, wherein at least one of the back wall, the covering and the front wall further comprises at least one reinforcing means.

15. The motor vehicle according to claim 14, wherein the at least one reinforcing means is formed by introducing a reinforcing material with greater loading capacity.

16. The motor vehicle according to claim 14, wherein the at least one reinforcing means is formed through reinforcing a wall thickness of the water box.

17. The motor vehicle according to claim 11, wherein between the back wall and the covering a connecting element in the form of at least one partial diagonal bracing is unitarily attached.

* * * * *